May 11, 1965 C. W. DITTRICK 3,182,844
TRANSPLANTING BOX
Filed March 28, 1963 2 Sheets-Sheet 1
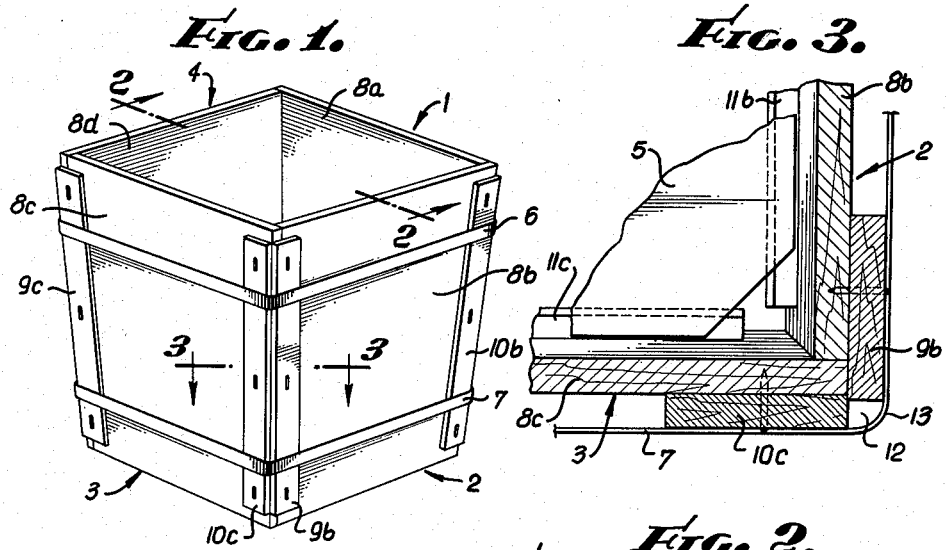
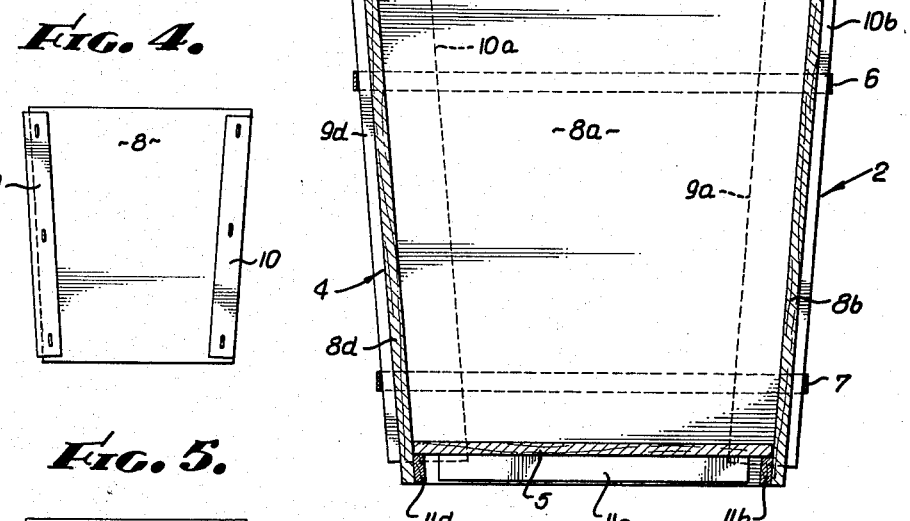
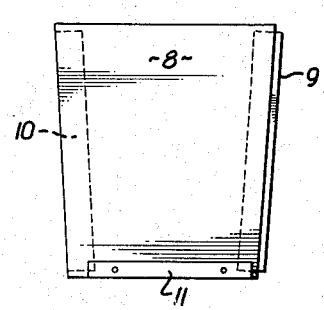
INVENTOR.
CARL W. DITTRICK
BY
Flam and Flam
ATTORNEYS.

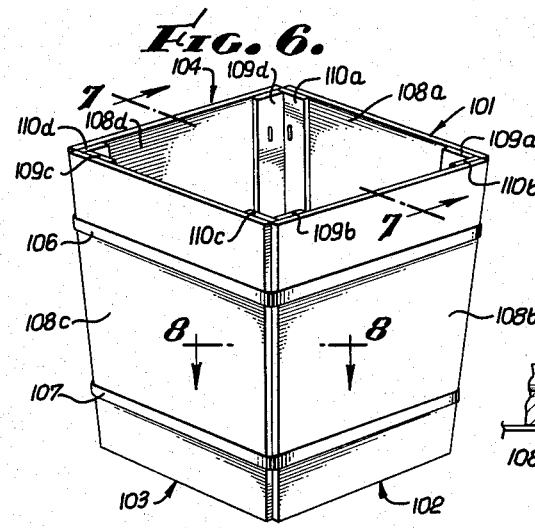
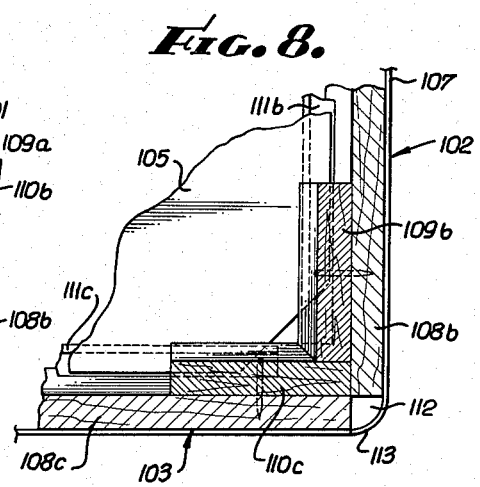
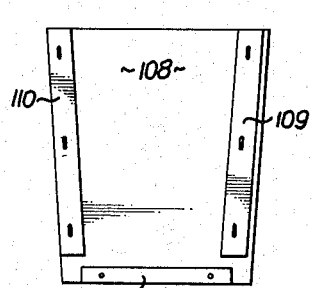
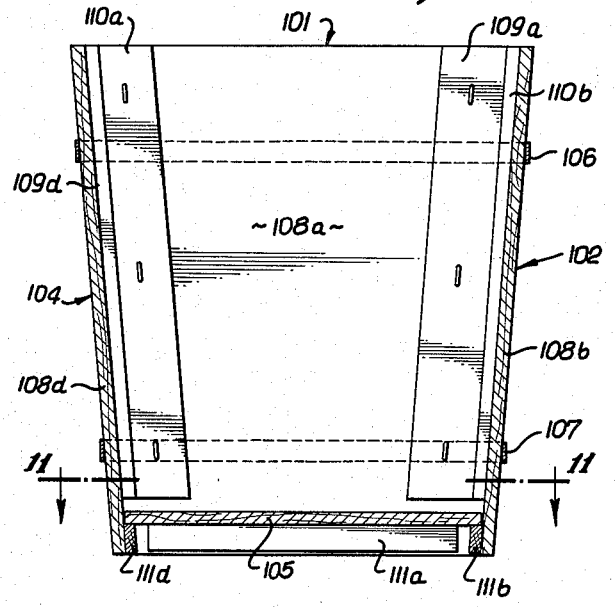
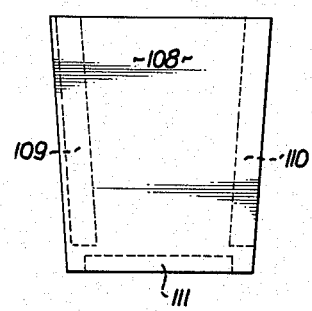
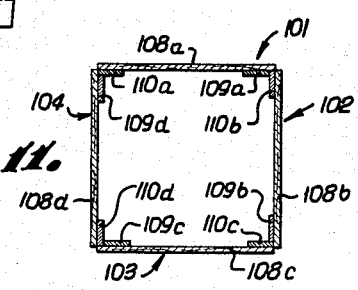

United States Patent Office 3,182,844
Patented May 11, 1965

3,182,844
TRANSPLANTING BOX
Carl W. Dittrick, Burbank, Calif., assignor to
John P. Dittrick, Downey, Calif.
Filed Mar. 28, 1963, Ser. No. 268,759
2 Claims. (Cl. 217—12)

This invention relates to the transplanting of trees, shrubs or other plants and more particularly to collapsible and reusable containers for the plants.

It is common to transport plants in metal cans or boxes. In such cases, care must be exercised to remove the plant without injury and without materially disturbing the earth surrounding the roots of the plants.

In using the common form of can or box it is quite difficult to prevent such injury, for the metal can or box must be cut lengthwise to open the container, and this often disturbs the earth around the roots. If the container is made of wood, the sides must be separated in some manner.

It is also often necessary for a manufacturer of such containers to ship them empty to the customer.

One of the objects of this invention is to provide a container of this character that is collapsible for easy shipment.

Another object is to provide a container from which the plant may readily be removed.

A further object is to provide a container of the type described that may be readily assembled from the collapsed parts, and without requiring banding machines.

This invention possesses many other advantages, and has other objects which may be made more clearly apparent from a consideration of one embodiment of the invention. For this purpose, there is shown a form in the drawings accompanying and forming a part of the present specification, and which drawings are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a perspective view of the preferred embodiment of the container, completely assembled;

FIG. 2 is a section taken on line 2—2 of FIG. 1;

FIG. 3 is a section taken on line 3—3 of FIG. 1;

FIG. 4 is a front elevation of one of the sides, all of them being identical;

FIG. 5 is a rear view of the structure shown in FIG. 4;

FIG. 6 is a perspective view of an alternative embodiment of the invention;

FIG. 7 is a view taken on line 7—7 of FIG. 6;

FIG. 8 is a view taken on line 8—8 of FIG. 6;

FIG. 9 is an inside view of one of the sides of the collapsible container;

FIG. 10 is an outside view of the structure shown in FIG. 9; and

FIG. 11 is a section taken on line 11—11 of FIG. 7.

The presently preferred embodiment of the invention comprises four side structures 1, 2, 3 and 4, a bottom or base member 5, and two endless metal bands 6 and 7.

Each of the side structures comprises, in addition to the wall member itself (indicated by the numeral 8 in FIGS. 4 and 5), three cleats 9, 10 and 11 which are appropriately attached, as by nails or staples, to the wall member. Distinguished according to their somewhat different functions, the generally longitudinally arranged cleats are referred to as cleating elements or cleating members, the cleating elements being disposed so that they are flush with one edge of the surface to which they are attached, whereas the cleating members overlap or extend beyond the wall members, as clearly shown by the position of the cleating member 9 in FIGS. 4 and 5 and by the cleating member 9b in FIG. 3. In the embodiment of the invention illustrated in FIGS. 1 to 5, each cleating member serves as an abutment for the edge of the adjoining wall, as shown in FIG. 3 where such adjoining wall 8c abuts against the cleating member 9b. This arrangement is followed all around the box.

The base or bottom member 5 rests upon the horizontal cleats, as shown in FIG. 2. At least two of the opposed walls, as indicated by walls 2 and 4 in FIG. 2, must be equipped with horizontal cleats, cleats 11b and 11d being shown in the figure as attached to wall members 8b and 8d respectively. For convenience in manufacturing and to avoid possible confusion in assembly, horizontal cleats are preferably attached to all the sides, an additional cleat 11a being shown attached to wall member 8a in FIG. 2.

In assembly, the two bands 6 and 7 are pushed upward around the side structures 1, 2, 3 and 4 from the bottom until they become wedged by the tapering configuration of the container. Thus the smaller of the two bands becomes wedged around the lower portion of the container, but the larger band 6 is not stopped by the wedging action until it reaches the upper portion of the container as shown in FIGS. 1 and 2.

Inasmuch as the cleating elements are flush with one of the side edges of the walls to which they are respectively attached, as shown in FIGS. 1, 3, 4 and 5, an open V-shaped angle 12, most graphically illustrated in FIG. 3, is formed at each of the four vertical corners of the container. The outwardly opening V's serve a very useful purpose for assembling and disassembling the container. As shown in FIG. 3, the portion 13 of the metal band 7 that spans the open portion of the V is readily accessible for forcing the band upwardly or downwardly against the wedging action of the tapering side structures for assembly or disassembly respectively. The portions 13 may be struck with a series of light hammer blows to force the band up or down as desired, or a rod or large screw-driver may be rested against the portion 13 to receive the actual impacts of the hammer or other tool. Both bands may of course be installed and removed in this manner. When the bands are removed, the four side structures readily collapse outwardly.

FIGS. 6 to 11 illustrate an embodiment of the invention in which all of the cleats are on the inside of the side walls, and the corner V's that are spanned by the metal bands are formed by the wall members themselves, as most clearly shown in FIG. 8. The figures illustrating this embodiment of the invention are given the same reference numbers as the corresponding parts in the embodiment just described, excepting that all the numbers have been increased by 100. This correlation of the reference characters makes the similarities of the functions in the two embodiments at once apparent.

When the cleats are all on the inside, the cleating members which are staggered or offset with respect to the walls to which they are attached, abut against the cleating elements, as clearly shown particularly in FIGS. 8 and 11; thus, cleating member 109b attached to wall member 108b (both constituting components of the side structure 102) abuts against the cleating element 110c of wall member 108c, and wall member 108b abuts against the end of cleating element 110c. As in the previously described embodiment, the arrangement that characterizes any one of the corners of the container is followed all around the assembly.

Also as in the previously described embodiment, the metal bands span the open portions of the V's 112, leaving the spanning portions 113 readily accessible for the application of force for assembling the box or for the removal of the bands.

It will be understood by those skilled in the art that still other embodiments of the invention may be made and that any of the parts may be replaced by substitute parts performing the same or additional functions, and that the various components may be rearranged or transposed—all without departing from the broad spirit of my invention as succinctly set forth in the appended claims.

The inventor claims:

1. A collapsible container for plants including: four substantially identical adjoining four-sided structures each opposing another and each being narrower at the bottom than at the top; a pair of horizontal cleats secured respectively to opposed structures on the inside surfaces thereof and substantially paralleling the bottom edges of the respective structures; an inner base resting on said horizontal cleats, each of said structures comprising a wall member having a substantially vertically extending cleating element and a substantially vertically extending cleating member attached to the outer surface of the wall member for cooperation with the other components of the container in holding the structure rigidly together, said cleating member extending along substantially the entire length of one side edge of said wall member, and said cleating element extending along substantially the entire length of the opposite side edge of said wall member in substantially edge-flush relationship thereto; said cleating member laterally overlapping the said one side edge by an amount corresponding substantially to the thickness of the wall member to form a right-angle laterally accessible recess extending substantially along the entire length of said one side edge and receiving and fitting substantially the entire length of the adjacent edge of the wall member of the adjoining structure; said cleating elements forming with the cleating members of the adjoining structures outwardly opening right-angle recesses extending substantially along the entire length of the edges of said structures; first and second preformed endless bands having different circumferential measurements and surrounding the upper and lower portions respectively of said structures; said bands each being pressed upwardly around said structures and wedged upon said structures by virtue of the tapering contour produced by said structures, the corners of said bands being accessible and spaced from said structures at said outwardly opening right-angle recesses for application of a tool to the said corners of said bands.

2. A collapsible container for plants including: four substantially identical adjoining four-sided structures each opposing another and each being narrower at the bottom than at the top; a pair of horizontal cleats secured respectively to opposed structures on the inside surfaces thereof and substantially paralleling the bottom edges of the respective structures; an inner base resting on said horizontal cleats, each of said structures comprising a wall member having a substantially vertically extending cleating element and a substantially vertically extending cleating member attached to the inner surface of the wall member for cooperation with the other components of the container in holding the structure rigidly together, said cleating member extending along substantially the entire length of one side edge of said wall member, and said cleating element extending along substantially the entire length of the opposite side edge of said wall member in substantially edge-flush relationship thereto; said one side edge of said wall member laterally overlapping the corresponding edge of said cleating member by an amount corresponding substantially to the thickness of the cleating element to form a right-angle laterally accessible recess extending substantially along the entire length of said one side edge and receiving and fitting substantially the entire length of the adjacent edge of the cleating element of the adjoining structure; the said one side edges of said wall members forming with the opposite side edges of the wall members of the adjoining structures, outwardly opening right-angle recesses extending substantially along the entire length of the edges of said structures; first and second preformed endless bands having different circumferential measurements and surrounding the upper and lower portions respectively of said structures; said bands each being pressed upwardly around said structures and wedged upon said structures by virtue of the tapering contour produced by said structures; the corners of said bands being accessible and spaced from said structures at said outwardly opening right-angle recesses for application of a tool to the said corners of said bands.

References Cited by the Examiner

UNITED STATES PATENTS

| 451,549 | 5/91 | Baker | 217—17 |
|---|---|---|---|
| 1,535,958 | 4/25 | Steele | 217—12 |
| 1,920,560 | 8/33 | Hile. | |
| 2,734,652 | 2/56 | McFree. | |
| 2,808,956 | 10/57 | Johnson | 217—48 |
| 2,890,809 | 6/59 | Poley | 217—43 |
| 3,006,496 | 10/61 | Weiman | 217—12 |

THERON E. CONDON, *Primary Examiner.*